United States Patent [19]
Boon et al.

[11] Patent Number: 5,952,737
[45] Date of Patent: Sep. 14, 1999

[54] SWITCH-OFF DEVICE FOR AIRPORT SERIES CIRCUITS

[75] Inventors: Julien Boon, Sint-Genesius-Rode; Jean-Claude Vandevoorde, Steenkokkerzeel, both of Belgium

[73] Assignee: Siemens Aktiengesellschaft, Munich, Germany

[21] Appl. No.: 09/080,210

[22] Filed: May 18, 1998

[30] Foreign Application Priority Data

May 16, 1997 [DE] Germany .............. 197 20 733

[51] Int. Cl.⁶ .............. H01H 1/04; H02B 1/24
[52] U.S. Cl. .............. 307/112; 307/139; 307/149; 307/154; 200/1 R
[58] Field of Search .............. 307/89, 100, 112, 307/119, 139, 140, 149, 154; 315/154, 217; 200/1 R, 5 A, 50.14, 61.72, 61.73, 61.74, 61.76; 324/415

[56] References Cited

U.S. PATENT DOCUMENTS

| | | | |
|---|---|---|---|
| 3,718,783 | 2/1973 | Kemenczky | 200/1 R |
| 4,076,971 | 2/1978 | Mukaemachi et al. | 379/30 |
| 4,652,706 | 3/1987 | Rao et al. | 200/1 R |
| 5,525,769 | 6/1996 | Anderson | 200/1 R |
| 5,708,309 | 1/1998 | Kubo | 307/126 |
| 5,828,277 | 10/1998 | Duchemin | 335/132 |

OTHER PUBLICATIONS

Series Plug Cutout, *ADB Aviation Lighting Systems,* Apr. 1987, 2pgs.

*Primary Examiner*—Jeffrey Gaffin
*Assistant Examiner*—Peter Zura
*Attorney, Agent, or Firm*—Sughrue, Mion, Zinn, Macpeak & Seas, PLLC

[57] ABSTRACT

A switch-off device for airport series circuits (2) has input terminals (3, 4) which are connected to a current source (1). It also has output terminals (5, 6) which are connected to a series circuit (2) and connecting elements (7, 8) by means of which the input terminals (3, 4) and the output terminals (5, 6) can be connected to one another. The switch-off device has an actuator (11) for the purpose of simplifying operation and permitting a plurality of different, clearly visible operating states. In a normal position, the actuator positions the connecting elements (7, 8) such that each input terminal (3, 4) is connected to an output terminal (5, 6). In a service position, it positions the connecting elements (7, 8) so that the input terminals (3, 4) are disconnected from the output terminals (5, 6) and are connected to a grounding terminal (9), while the output terminals (5, 6) are connected to one another and to the grounding terminal (9). In a testing position, the actuator positions the connecting elements (7, 8) in such a way that the input terminals (3, 4) are disconnected from the output terminals (5, 6) and are connected to the grounding terminal (9), and the output terminals (5, 6) are connected to one another and to a test terminal (10).

4 Claims, 1 Drawing Sheet

SWITCH-OFF DEVICE FOR AIRPORT SERIES CIRCUITS

The following disclosure is based on German Patent Application No. 19720733.2, filed on May 16, 1997, which is incorporated into this application by reference.

FIELD OF AND BACKGROUND OF THE INVENTION

The invention relates to new and useful improvements in airport engineering. More particularly, the invention relates to a switch-off device for series circuits at airports, having input terminals which are connected to a current source, output terminals which are connected to an airport series circuit, and connecting elements by means of which the input terminals and the output terminals can be connected to one another. Examples of series circuits at airports, to which the present invention is applicable, include runway and taxiway lights, stop bar lights, and aircraft sensors and detectors.

In existing devices of such type, it is necessary for a plug which connects the current source and the series circuit to be withdrawn from its holding device. Two operating states are defined: first, a state in which the plug is seated inside the holding device provided for it and second, a state in which the plug is withdrawn from the holding device. These states correspond respectively to a normal state, in which the series circuit is connected to the current source and a non-operational state, in which the series circuit is disconnected from the current source. When such a plug is withdrawn, conductors suitable for conducting current are exposed. This can pose risks in particular to the operating and maintenance personnel who come in contact with the switch-off device. A more detailed description of such an existing device is found, e.g., in the ADB brochure "Series Plug Cutout", 2/04.87, which is hereby incorporated into the present application by reference.

OBJECTS OF THE INVENTION

It is therefore an object of the invention to provide a switch-off device for airport series circuits that is easier to operate and satisfies higher safety requirements. It is a further object to provide such a switch-off device that permits a larger number of different, easily recognizable operating states.

SUMMARY OF THE INVENTION

These and other objects are achieved by the teaching of claim 1. Particularly advantageous refinements of the invention are the subject matter of the dependent claims. According to the invention, the switch-off device has an actuator which, in a normal position, positions the connecting elements such that each input terminal is connected to an output terminal. In a service position, it positions the connecting elements in such a way that the input terminals are disconnected from the output terminals and are connected to a grounding terminal, while the output terminals are connected to one another and to the grounding terminal. Finally, in a test position, the actuator positions the connecting elements so that the input terminals are disconnected from the output terminals and connected to the grounding terminal, while the output terminals are connected to one another and to a test terminal. The result is a greatly enhanced functionality in comparison with the conventional switch-off devices that utilize a plug. First, the actuator permits three different operating states to be set. Second, the operating state set at any time is immediately apparent from the position of the actuator. In the normal position of the actuator, the series circuit is connected only to the current source. In the service position of the actuator, the series circuit is disconnected from the current source and connected to ground. In the test position of the actuator, the series circuit is disconnected both from the current source and from ground.

As such, the switch-off device according to the invention therefore functions as a protective switch which is activated only in normal operation, i.e. with the actuator in the normal position. This switch interrupts the operation of its assigned current source in any position of the actuator other than the normal position. In addition, the switch permits the device to be switched exclusively to a circuit with a very low load. The switch-off device according to the invention ensures thus that operating and maintenance personnel are not exposed to an electrical risk in any of the three operating modes. Accordingly, for example, the insulation can be checked without the current source posing a safety risk.

To increase safety further, it is advantageous for the actuator to lock in the normal, service and testing positions. For example, in the service position of the actuator, this preferably mechanical locking mechanism can reliably exclude the possibility of inadvertently connecting the series circuit to high voltage while service personnel are at work.

If, while the actuator is in the service position or testing position, the connecting elements are positioned in such a way that they connect the input terminals to one another, the current source, which is usually a constant-current source, is short-circuited in every operating state except normal operation. As a result, it is possible to check the constant-current source without the buildup of high voltages.

It is expedient for the switch-off device according to the invention to be configured in such a way that a large amount of energy stored in it can be discharged capacitively into the series circuit.

The switch-off device according to the invention is produced from an insulator on which the required contacts and connections are provided for carrying out the mode of operation explained above.

BRIEF DESCRIPTION OF THE DRAWINGS

The invention and further advantageous refinements thereof according to the features of the dependent claims are explained in more detail below with the aid of diagrammatic, exemplary embodiments in the drawing, in which:

DETAILED DESCRIPTION OF THE PREFERRED EMBODIMENTS

Figure 1:
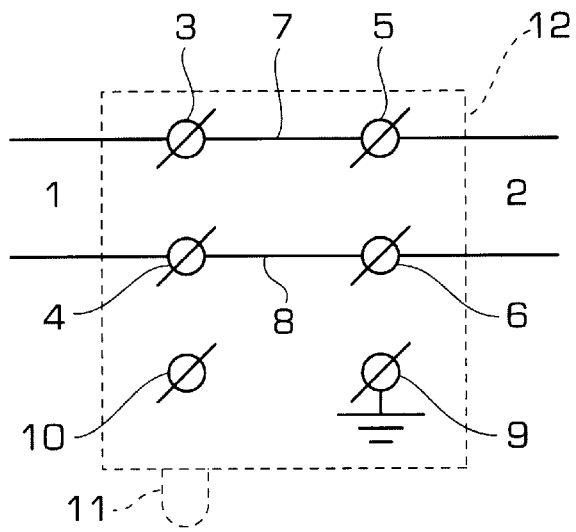
FIG. 1 shows a representation of the principle of the switch-off device according to the invention, with the actuator in its normal position.
Figure 2:
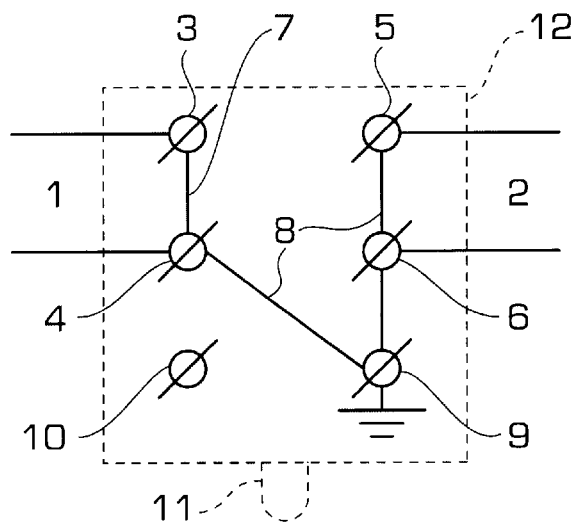
FIG. 2 shows a representation corresponding to FIG. 1, in which the actuator is in its service position.
Figure 3:
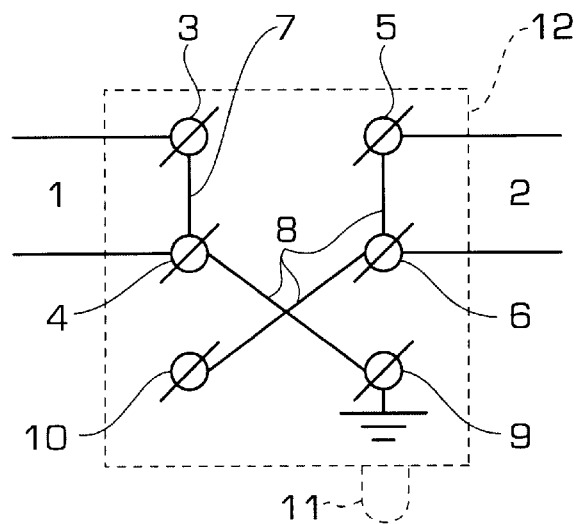
FIG. 3 shows a representation corresponding to FIGS. 1 and 2, in which the actuator is in its testing position.

The principle of the switch-off device according to the invention is shown in FIGS. 1 to 3 in different positions. The device is used to connect a constant-current source 1 to a series circuit 2 at an airport, or to disconnect the constant-current source 1 from the series circuit 2.

For this purpose, the device has two input terminals 3, 4 and two output terminals 5, 6, which can be connected to one another or disconnected from one another by means of electrical connecting elements 7, 8. Also provided in the device is a grounding terminal 9 and a test terminal 10. These can be connected to the series circuit 2 by means of the connecting element 8.

In order to bring the switch-off device into one of the positions shown in FIGS. 1 to 3, the switch-off device has an actuator 11 which is used to adjust the connecting elements 7, 8 and which, for its part, can be locked in the normal position (shown in FIG. 1), the service position (shown in FIG. 2) and the testing position (shown in FIG. 3) by means of a locking mechanism 13.

In the normal position (FIG. 1), the input terminals 3, 4 are connected to the output terminals 5, 6 by means of the connecting elements 7, 8. The constant-current source 1 is connected to the series circuit 2 to thereby render the series circuit 2 operational.

In the service position (FIG. 2), the input terminals 3, 4 are connected to one another and to the grounding terminal 9, the result being that the constant-current source 1 is short-circuited. The output terminals 5, 6 are connected to one another as well as to the grounding terminal 9. It is therefore possible to undertake service and maintenance work on the series circuit 2 without any sort of risk to maintenance personnel or equipment.

In the testing position (FIG. 3), the constant-current source 1 is short-circuited, as outlined in conjunction with FIG. 2. The output terminals 5, 6 are connected to one another and to the test terminal 10. It is therefore possible to carry out investigations, tests and the like on the series circuit 2 without risk of injury or damage.

Unlike the conventional art, the switch-off device shown in FIGS. 1–3 provides three different operating states. It should be noted, however, that the invention is not confined to only three states or the particular three states described. The principles underlying the invention allow for the modification of the disclosed embodiments to include additional operating states.

In the embodiment shown, the switch-off device is changed between operating states by moving the actuator 11 from one position to another relative to the housing 12. Here the actuator is shown as having a sliding knob. However, the invention is not limited to such an embodiment and encompasses a wide range of mechanical and electrical alternatives, including rotating knobs, push-buttons, touch-sensitive elements with associated indicators, and the like. Preferably, each of the three operating states is associated with a predetermined locking position for the actuator 11, which provides at least a relatively higher resistance for moving the actuator out of the locking position. Appropriate locking mechanisms 13 for providing this feature include spring-and-notch arrangements, spring-clamp arrangements, screw-type clamping arrangements, etc.

As evident from a comparison of FIGS. 1, 2 and 3, the currently set operating state of the switch-off device is immediately apparent from the position of the actuator 11 relative to the base of the housing 12. Thus, a cursory visual or manual inspection suffices to determine the current operating state of the switch-off device.

The housing 12 is preferably formed of insulating material or includes a protective layer shielding the various terminals and connecting elements 3–10 from the exterior of the housing. This further enhances the overall safety of the switch-off device.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A switch-off device for an airport series circuit, comprising:

input terminals connected to a current source;

output terminals connected to the series circuit;

a grounding terminal and a test terminal;

connecting elements for selectively electrically connecting and disconnecting said input terminals, said output terminals, said grounding terminal and said test terminal; and an actuator for selectively positioning the connecting elements in a normal position, a service position and a testing position, wherein:

in the normal position, said actuator positions said connecting elements within said device to electrically connect each of said input terminals to a corresponding one of said output terminals, in the service position, said actuator positions said connecting elements within said device to electrically disconnect said input terminals from said output terminals, to electrically connect said input terminals to said grounding terminal, to electrically connect said output terminals together, and to electrically connect said output terminals to said grounding terminal, and in the testing position, said actuator positions said connecting elements within said device to electrically disconnect said input terminals from said output terminals, to electrically connect said input terminals to said grounding terminal, to electrically connect said output terminals together, and to electrically connect said output terminals to said test terminal.

2. The switch-off device as claimed in claim 1, further comprising a locking mechanism for locking said actuator selectively in the normal position, in the service position and in the testing position.

3. The switch-off device as claimed in claim 1, wherein, in the service position, said actuator further positions said connecting elements within said device to electrically connect said input terminals together.

4. The switch-off device as claimed in claim 1, wherein, in the testing position, said actuator further positions said connecting elements within said device to electrically connect said input terminals together.

* * * * *